United States Patent
Park et al.

(10) Patent No.: US 9,766,533 B2
(45) Date of Patent: Sep. 19, 2017

(54) FLASH DEVICE, AND IMAGING METHOD

(71) Applicant: SAMSUNG ELECTRONICS CO., LTD., Suwon-si, Gyeonggi-do (KR)

(72) Inventors: Moo Youn Park, Seongnam-si (KR); Jin Ha Kim, Yongin-si (KR); Hyung Suk Kim, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 12 days.

(21) Appl. No.: 14/535,879

(22) Filed: Nov. 7, 2014

(65) Prior Publication Data
US 2015/0227025 A1   Aug. 13, 2015

(30) Foreign Application Priority Data
Feb. 12, 2014   (KR) .................. 10-2014-0015855

(51) Int. Cl.
| H04N 5/222 | (2006.01) |
| G03B 15/05 | (2006.01) |
| H04N 5/225 | (2006.01) |
| H05B 33/08 | (2006.01) |
| H04N 5/235 | (2006.01) |

(52) U.S. Cl.
CPC .......... G03B 15/05 (2013.01); H04N 5/2256 (2013.01); H04N 5/2354 (2013.01); H05B 33/0869 (2013.01); *G03B 2215/0567* (2013.01)

(58) Field of Classification Search
CPC ... G03B 15/05; H05B 33/0854; H04N 5/2256
USPC ......... 348/371, 223.1, 224.1, 225.1; 396/157
See application file for complete search history.

(56) References Cited

U.S. PATENT DOCUMENTS

| 4,088,265 A | 5/1978 | Garczynski |
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,046,401 B2 | 5/2006 | Dufaux et al. |
| 7,084,420 B2 | 8/2006 | Kim et al. |
| 7,087,932 B2 | 8/2006 | Okuyama et al. |

(Continued)

FOREIGN PATENT DOCUMENTS

| KR | 2006-0014790 A | 2/2006 |
| KR | 10-0621007 B1 | 9/2006 |

(Continued)

*Primary Examiner* — Sinh Tran
*Assistant Examiner* — Zhenzhen Wu
(74) *Attorney, Agent, or Firm* — Lee & Morse P.C.

(57) ABSTRACT

A flash device for a camera includes a light source unit and a driving unit. The light source unit includes a plurality of light emitting devices, each of which is configured to output light of different colors. The driving unit is configured to drive a first light emitting device among the plurality of light emitting devices when the camera images a subject to obtain a first image, and drive a second light emitting device different from the first light emitting device among the plurality of light emitting devices when the camera images the subject to obtain a second image.

16 Claims, 6 Drawing Sheets

(56) References Cited

U.S. PATENT DOCUMENTS

| | | |
|---|---|---|
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,378,596 B2 | 2/2013 | Ayres |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,570,433 B1 * | 10/2013 | Goldberg ............. H04N 5/2354 348/222.1 |
| 8,735,931 B2 | 5/2014 | Han et al. |
| 8,766,295 B2 | 7/2014 | Kim |
| 2005/0190288 A1 * | 9/2005 | Yamada ............... H04N 5/2354 348/371 |
| 2006/0067668 A1 * | 3/2006 | Kita ....................... G03B 15/05 396/182 |
| 2007/0195193 A1 * | 8/2007 | Kawakami ............ H04N 9/735 348/371 |
| 2007/0230939 A1 | 10/2007 | Tanaka et al. |
| 2007/0257992 A1 * | 11/2007 | Kato ...................... H04N 9/735 348/223.1 |
| 2009/0102964 A1 * | 4/2009 | Yuyama ............... H04N 5/2256 348/371 |
| 2010/0046936 A1 * | 2/2010 | Takahashi ................ G03B 7/08 396/157 |
| 2010/0254692 A1 * | 10/2010 | Kurt ....................... G03B 15/03 396/155 |
| 2012/0313908 A1 * | 12/2012 | Broga .................. G06F 1/1684 345/207 |
| 2013/0038763 A1 * | 2/2013 | Tozawa .................. H04N 5/367 348/247 |
| 2014/0085503 A1 * | 3/2014 | Su ........................... G03B 7/16 348/223.1 |

FOREIGN PATENT DOCUMENTS

| | | |
|---|---|---|
| KR | 10-0723060 B1 | 5/2007 |
| KR | 10-2008-0032591 A | 4/2008 |
| KR | 10-0819810 B1 | 4/2008 |
| KR | 10-0968378 B1 | 7/2010 |
| KR | 10-2011-0086981 A | 8/2011 |
| KR | 10-1203268 B1 | 11/2012 |
| KR | 10-2013-0097851 A | 9/2013 |
| KR | 10-1303230 B1 | 9/2013 |
| WO | 2010/101434 A2 | 9/2010 |

* cited by examiner

FLASH DEVICE, AND IMAGING METHOD

CROSS-REFERENCE TO RELATED APPLICATION

This application claims priority to Korean Patent Application No. 10-2014-0015855 filed on Feb. 12, 2014, with the Korean Intellectual Property Office, the entire content of which is incorporated herein by reference.

TECHNICAL FIELD

The present disclosure relates to a flash device, an imaging device, and an imaging method.

BACKGROUND

Semiconductor light emitting devices such as light emitting diodes (LEDs) emit light of a certain wavelength due to materials included therein. Namely, in semiconductor light emitting devices, energy generated according to electron-hole recombination is converted into light to be emitted. LEDs have been commonly used as light sources in lighting devices, display devices, and the like, and recently, the development of LEDs has been accelerated, and the utilization of LEDs has been expanded into the field of flashes for imaging devices.

In the case of the application of an LED to a flash of an imaging device, a flash may be driven with a small amount of power, relative to other light sources, obtaining advantages in terms of battery management in the use of imaging devices included in portable devices. Also, LEDs may be implemented to have a relatively small form factor in a relatively small area, relative to other light sources, and thus, LEDs may be easily used in camera flashes in smartphones, or the like, having a high degree of hardware integration.

SUMMARY

An aspect of the present disclosure may provide a flash device and an imaging device capable of obtaining a natural color tone similar to that of an image captured under natural light, even under conditions in which an image is captured using a flash.

One aspect of the present disclosure relates to a flash device for a camera including a light source unit and a driving unit. The light source unit includes a plurality of light emitting devices, each of which is configured to output light of different colors. The driving unit is configured to drive a first light emitting device among the plurality of light emitting devices when the camera images a subject to obtain a first image, and drive a second light emitting device different from the first light emitting device among the plurality of light emitting devices when the camera images the subject to obtain a second image.

The light source unit may include one or more light emitting devices configured to output white light.

One of the first light emitting device and the second light emitting device may output white light, and the other of the first light emitting device and the second light emitting device may output colored light.

Light outputted by the first light emitting device and light outputted by the second light emitting device may have color characteristics complementing each other.

At least one of the first light emitting device and the second light emitting device may be configured to output white light.

The driving unit may be configured determine outputs from the first light emitting device and the second light emitting device based on at least one of a color temperature of ambient light sensed by the camera and an operation mode of the camera.

The driving unit may be configured to select the first light emitting device and the second light emitting device among the plurality of light emitting devices based on at least one of a color temperature of ambient light sensed by the camera and an operation mode of the camera.

Another aspect of the present disclosure encompasses an imaging device including a flash unit, a camera unit and a controller. The flash unit includes a plurality of light emitting devices respectively outputting light of different colors. The camera unit is configured to image a subject to sequentially obtain a first image and a second image. The controller is configured to sequentially drive a first light emitting device among the plurality of light emitting devices when the camera unit images the subject to obtain the first image and drive a second light emitting device different from the first light emitting device when the camera unit images the subject to obtain the second image. The controller is configured to generate a third image based on the first image and the second image.

The camera unit may include an optical unit and an image sensor unit. The optical unit may include one or more lenses. The image sensor unit may be configured to convert light introduced through the optical unit into an electrical signal.

The controller may be configured to sense a color temperature of light introduced through the optical unit based on the electrical signal.

The controller may be configured to select the first light emitting device and the second light emitting device from among the plurality of light emitting devices based on at least one of a color temperature of ambient light sensed by the image sensor unit and an operation mode of the camera unit.

The controller may be configured to determine outputs from the first light emitting device and the second light emitting device based on at least one of a color temperature of ambient light sensed by the image sensor unit and an operation mode of the camera unit.

The controller may be configured to generate the third image by applying predetermined weighted values to pixel data of the first image and pixel data of the second image.

The controller may be configured to determine the weighted values applied to the pixel data of the first image and the pixel data of the second image based on respective outputs from the first light emitting device and the second light emitting device.

The controller may determine the weighted values applied to the pixel data of the first image and the pixel data of the second image based on respective colors of the first light emitting device and the second light emitting device.

At least one of the first light emitting device and the second light emitting device may output white light.

Light outputted by the first light emitting device and light outputted by the second light emitting device have color characteristics complementing each other.

Still another aspect of the present disclosure relates to an imaging method using a camera including an image sensor unit. The method includes sensing a color temperature of light introduced to the image sensor. A first light emitting device is driven based on at least one of an operation mode of the camera and the sensed color temperature. A first image is obtained when the first light emitting device is driven. A second light emitting device is driven based on at least one of the operation mode of the camera and the sensed color temperature. A second image is obtained when the second light emitting device is driven. A third image is generated based on the first image and the second image.

The first light emitting device may output first light and the second light emitting device may output second light having a color characteristic complementing a color characteristic of the first light.

At least one of the first light emitting device and the second light emitting device may output white light.

In the generating of the third image, the third image may be generated by applying predetermined weighted values to pixel data of the first image and pixel data of the second image.

The weighted values may be determined based on at least one of the sensed color temperature and the operation mode of the camera unit.

Values inputted by a user of the camera may be set as the weighted values.

Still another aspect of the present disclosure encompasses a mobile device including the imaging device.

Still another aspect of the present disclosure relates to an imaging device including a flash unit, a camera unit and a controller. The flash unit includes a plurality of light emitting devices and is configured to output light. The camera unit is configured to image a subject to obtain an image. The controller is configured to determine first light and second light, and simultaneously drive a first light emitting device and a second light emitting device among the plurality of light emitting devices to output the determined first light and the determined second light, respectively, when the camera unit images the subject to obtain the image. The controller is configured to drive the first light emitting device and the second light emitting device such that the outputted first light and the outputted second light have different colors from each other.

The controller may be configured to determine color characteristics of the first light and the second light based on ambient light information and an operation mode of the camera unit.

The controller may be configured to adjust color characteristics of the first and second light outputted by the flash unit based on color temperature information of ambient light and an operation mode of the camera unit.

The camera unit may have an operation mode selected from a portrait imaging mode, a night view imaging mode, a landscape imaging mode, and a close-up mode.

BRIEF DESCRIPTION OF DRAWINGS

The above and other aspects, features and other advantages of the present disclosure will be more clearly understood from the following detailed description taken in conjunction with the accompanying drawings, in which like reference characters may refer to the same or similar parts throughout the different views. The drawings are not necessarily to scale, emphasis instead being placed upon illustrating the principles of the embodiments of the present inventive concept. In the drawings, the thickness of layers and regions may be exaggerated for clarity.

DETAILED DESCRIPTION

Figure 1:
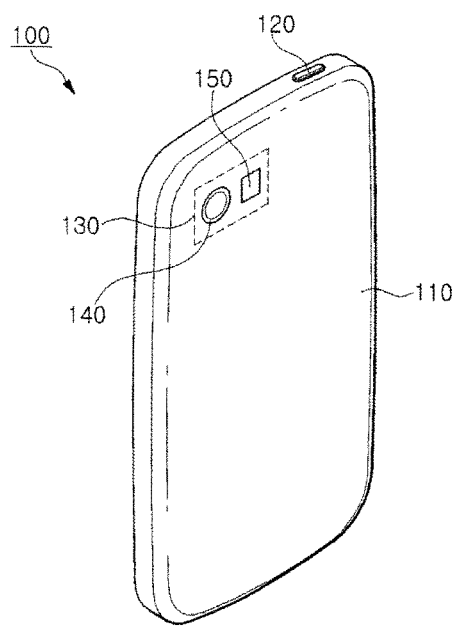
FIG. 1 is a perspective view illustrating the exterior of a mobile device employing an imaging device according to an exemplary embodiment of the present inventive concept.

Hereinafter, exemplary embodiments of the present inventive concept will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a perspective view illustrating the exterior of a mobile device employing an imaging device according to an exemplary embodiment of the present inventive concept.

Referring to FIG. 1, a mobile device 100 may be a smartphone, a personal digital assistant (PDA), a tablet PC, an MP3 player, a digital camera, or the like. Namely, the mobile device 100 may include an imaging device 130, and various portable devices may be included in the mobile device 100 according to an exemplary embodiment of the present inventive concept. Hereinafter, for the purposes of description, an operation of the mobile device 100 according to an exemplary embodiment of the present inventive concept will be described by taking a smartphone as an example.

Referring to FIG. 1, the mobile device 100 may include a housing 110, a button unit 120 for inputting a command by a user, an imaging device 130, and the like. In addition to the foregoing elements, the mobile device 100 may further include a central processing unit (CPU) for performing calculations, processing commands, and the like, a communications module for performing wired/wireless communications, a display unit for displaying an image, a touch screen unit integrally provided with the display unit, an audio unit for outputting sound, a microphone unit for inputting sound, and various sensors for providing various functions.

The imaging device 130 may include a camera unit 140 for obtaining an image, and a flash unit 150 including a plurality of light emitting devices. Also, the imaging device 130 may include a controller for processing an image obtained by the camera unit 140 and controlling an operation of the flash unit 150. In an exemplary embodiment of the present inventive concept, the controller of the imaging device 130 may be provided as a single chip, package, or the like, together with the CPU of the mobile device 100.

The flash unit 150 may include a plurality of light emitting devices each for outputting light of different colors. For example, the flash unit 150 may include a first light emitting device for outputting light of a color corresponding to white light and a second light emitting device for outputting light of a color corresponding to colored light, other than white light. The first light emitting device for outputting white light may be implemented as a single light emitting diode (LED) or may be implemented as a plurality of LEDs. The first light emitting device may output white light having a color temperature within a predetermined range (for example, 4,500K to 6,500K), and the second light emitting device may output visible light corresponding to a particular color such as red, yellow, blue, and the like. For example, when the second light emitting device includes a red light source, a color temperature of light output by the second light emitting unit may range from 1,500K to 3,000K. When the second light emitting device includes a yellow light source, a color temperature thereof may be defined to range from 3,000K to 4,500K. When the second light emitting device includes a blue light source, a color temperature thereof may be 6,500K or higher.

Also, in another exemplary embodiment of the present inventive concept, the flash unit 150 may include a first light emitting device for outputting light having a color temperature corresponding to a warm white color tone, a second light emitting device for outputting light having a color temperature corresponding to a cool white tone, and a third light emitting device for outputting visible light corresponding to a particular color, other than white. In this case, the color temperatures of light output by the first and second light emitting devices may be limited to ranges in which they do not overlap.

Also, in another exemplary embodiment of the present inventive concept, the flash unit 150 may include only two or more light emitting devices for outputting visible light corresponding to particular colors, other than white. For example, the first light emitting device may output visible light corresponding to a red color, and the second light emitting device may output visible light corresponding to any other color (e.g., yellow, red, blue, and the like).

In particular, light outputted by the first light emitting device and the second light emitting device may have color characteristics complementing each other. Since the first and second light emitting devices output light having color characteristics complementing each other, if necessary, the first and second light emitting device may be simultaneously driven to obtain an effect similar to that of a flash including a white light source. Meanwhile, in the above, the light sources that may be included in the first and second light emitting devices are presented with numerical values of color temperature, but the present disclosure is not limited to the foregoing numerical values.

The camera unit 140 may include an optical unit having one or more lenses, an image sensor unit for converting light introduced through the optical unit after being reflected from a subject into an electrical signal to obtain an image, and the like. The image sensor unit may include a complementary metal-oxide semiconductor (CMOS) sensor, a charge coupled device (CCD) sensor, or the like. The image sensor unit may generate an electrical signal from light introduced through the optical unit and obtain an image based on the generated electrical signal. The imaging device 130 may calculate color temperature information of light introduced through the optical unit, and the like, based on the electrical signal generated by the image sensor unit, and set a white balance value appropriate for imaging a subject, or the like, from the calculated color temperature information, or the like.

In an exemplary embodiment of the present inventive concept, the imaging device 130 may sequentially or simultaneously drive the plurality of light emitting devices included in the flash unit 150, and obtain an image by controlling the camera unit 140 while the plurality of light emitting devices are operating.

When the plurality of light emitting devices operate sequentially, the camera unit may obtain an image with a flash as which each of the light emitting devices outputting light of different colors operates. Namely, the camera unit 140 may obtain a plurality of images with respect to a single object. For example, when the first light emitting device included in the flash unit 150 outputs light corresponding to cool white and the second light emitting device outputs visible light corresponding to a yellow color, the imaging device 130 may obtain a first image obtained by imaging a subject by using a light source based on cool white as a flash and a second image obtained by imaging the same subject by using a light source based on a yellow color.

Since the camera unit images the subject using the first and second light emitting devices outputting light of different colors as flashes, even though the first and second images are obtained by imaging the same object under the same external light source conditions, the first and second images may have different color tones. The imaging device 130 may appropriately synthesize the first and second images having different color tones to generate a third image as an outcome, and may selectively store at least one of the first to third images in a memory.

When the plurality of light emitting devices operate simultaneously, the camera unit 140 may image a subject at a point in time at which the plurality of light emitting devices outputting light having different colors operate simultaneously, to obtain a single image. In this case, in order to apply a natural color tone intended by a user or filter effects using an intentional color tone distortion to the image, the imaging device 130 may adjust driving current values respectively applied to the plurality of light emitting devices. By adjusting the driving current values respectively applied to the plurality of light emitting devices, respective outputs from the light emitting devices may be adjusted, and thus, color characteristics of light outputted by the flash unit 150 as the plurality of light emitting devices operate simultaneously may be controlled.

For example, compared to a case in which a subject is imaged using only a light emitting device outputting white light as a flash, when the first light emitting device for outputting white light and the second light emitting device for outputting colored light are driven and used as flashes, an image having a more natural color tone may be obtained. When a subject desired to be imaged is a person, the use of only the light emitting device outputting white light as a flash, a skin color of such an imaged person may generally be a greenish or yellowish, thereby obtaining an image having an unnatural color tone. In contrast, when the person is imaged using a light emitting device outputting red light together with the light emitting device outputting white light as flashes, a red color tone may be added to the skin tone of the person captured as a subject, thereby obtaining an image close to an actual skin color thereof and having a natural color tone.

Figure 2:
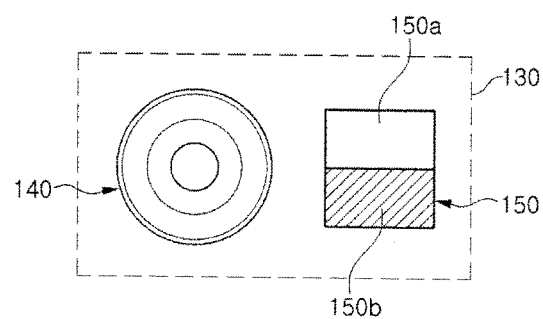
FIG. 2 is an enlarged view illustrating the imaging device of the mobile device illustrated in FIG. 1.

FIG. 2 is an enlarged view illustrating the imaging device of the mobile device illustrated in FIG. 1.

Referring to FIG. 2, the imaging device 130 applied to the mobile device 100 may include the camera unit 140 and the flash unit 150. The camera unit 140 may include the image sensor unit for generating an image from light reflected from a subject and the optical unit for collecting light reflected from the subject and delivering the collected light to the image sensor unit. The flash unit 150 may include a plurality of light emitting devices 150a and 150b for outputting light of different colors.

The optical unit included in the camera unit 140 may have one or more lenses, and may collect light reflected from a subject and deliver the collected light to the image sensor unit. In an exemplary embodiment of the present inventive concept, the optical unit may include a plurality of lenses arranged in an optical axis direction. The image sensor unit for sensing light delivered from the outside through the optical unit and generating an image may include a CMOS sensor, a CCD sensor, or the like. The image sensor unit may include an integrated circuit including a pixel array, a color filter array (CFA) disposed in the pixel array to determine wavelength information of light delivered through the optical unit, and the like. In order to provide information regarding intensity of light in each of red, green, and blue wavelength bands, a unit color filter array of the CFA may include at least one of a red element, a green element, and a blue element.

The flash unit 150 may include the plurality of light emitting devices 150a and 150b, and the respective light emitting devices 150a and 150b may output light of different colors. For example, the first light emitting device 150a may output white light, and the second light emitting device 150b may output colored light such as red, blue, yellow, or the like. As described above, the first light emitting device may output white light having a color temperature ranging from 4,500K to 6,500K, for example, and the second light emitting device may output visible light corresponding to a particular color such as red, yellow, blue, and the like. For example, when the second light emitting device includes a red light source, a color temperature of light emitted by the second light emitting device may range from 1,500K to 3,000K. When the second light emitting device includes a yellow light source, a color temperature may be defined to range from 3,000K to 4,500K, and when the second light emitting device includes a blue light source, a color temperature may be 6,500K or higher.

Alternatively, both the first light emitting device 150a and the second light emitting device 150b may output colored light. Colored light outputted by the first light emitting device 150a and the second light emitting device 150b may complement each other. By simultaneously driving the first and second light emitting devices 150a and 150b outputting light complementing each other to generate white light, a white flash that is generally used may be implemented. In particular, unlike the case of implementing the flash unit 150 only with the light emitting device for outputting white light, a color tone of white light outputted by the flash unit 150 may be minutely adjusted by adjusting respective outputs from the first and second light emitting devices 150a and 150b to thereby minutely adjust a white balance value of an image captured by the camera unit 140, or a color tone may be intentionally distorted to provide a desired filter effect, or the like.

In an exemplary embodiment of the present inventive concept, the first and second light emitting devices 150a and 150b included in the flash unit 150 may operate sequentially. Namely, the first light emitting device 150a may first emit light and the second light emitting device 150b may subsequently emit light, or the second light emitting device 150b may first emit light and the first light emitting device 150a may subsequently emit light. When the first and second light emitting devices 150a and 150b sequentially emit light, the camera unit 140 may image the same subject to obtain first and second images.

The controller of the imaging device 130 may synthesize the first and second images captured by the camera unit 140 to generate a third image. When the first light emitting device 150a outputs white light and the second light emitting device 150b emits red light, the first image captured by the camera unit 140 when the first light emitting device 150a emits light may be an image in which a green or yellow color tone of a subject is strongly expressed. Meanwhile, the second image captured by the camera unit 140 when the second light emitting device 140b emits light may be an image in which a red color tone of the subject is strongly expressed. The controller of the imaging device 130 may synthesize the first image and the second image to generate a third image in which the subject is imaged with in natural color tones, e.g., those similar to color tones seen by the camera user's eyes.

Operations of the first and second light emitting devices 150a and 150b included in the flash unit 150 may be determined by at least one of a color temperature of ambient light sensed by the image sensor unit and an operation mode of the camera unit 140. The color temperature of ambient light may be sensed by converting light introduced from the outside through the optical unit into an electrical signal by the image sensor unit. For example, light reflected from a subject and light immediately introduced from an external light source, i.e., solar light or lighting (a light source such as an incandescent lamp, a fluorescent lamp, or the like), without being reflected from the subject, may be delivered to the image sensor unit through the optical unit. The image sensor unit may convert light into an electrical signal, and the controller may sense a color temperature of ambient light using the electrical signal converted by the image sensor unit.

A color tone of a subject actually seen by the eyes of the user using the imaging device 130 may be determined according to characteristics of an external light source positioned in the vicinity of a subject. Thus, when a subject is intended to be imaged to obtain an image having a natural color tone similar to a color tone seen by the user's eyes, the imaging device 130 may determine outputs from the first light emitting device 150a and the second light emitting device 150b in consideration of a color temperature of ambient light. When imaging a subject, an image obtained by imaging the subject may be determined according to outputs from the light emitting devices 150a and 150b used as flashes, and thus, an image of the subject in a desired color tone may be obtained according to an external light source by adjusting outputs from the first light emitting device 150a and the second light emitting device 150b.

Also, the imaging device 130 may select one from the light emitting devices 150a and 150b actually emitting light in the flash unit 150 according to the results of sensing the color temperature of ambient light. Namely, if it is determined according to the results of sensing the color temperature of ambient light that a subject may be imaged with a color tone matched to the color temperature of ambient light by applying only the first light emitting device 150a outputting white light, the second light emitting device 150b may not be used as a flash when imaging the subject. Unlike the exemplary embodiment of FIG. 2, when the flash unit 150 includes three or more light emitting devices, two or more light emitting devices may be selectively used as flashes according to a sensed color temperature of ambient light.

Also, when determining outputs from the plurality of light emitting devices 150a and 150b and selecting the light emitting devices 150a and 150b used as flashes from among the plurality of light emitting devices, an operation mode of the camera unit 140 may be considered. For example, when the user sets an operation mode of the camera unit 140 to an auto-imaging module, the imaging device 130 may automatically set optimized imaging conditions to image a subject. A case in which ambient light of a subject has a color temperature of approximately 3,000K, close to a red-yellowish color like an incandescent lamp, a case in which ambient light of a subject has a color temperature of approximately 5,000K, like solar light in a clear day, and the like, may be distinguished from each other, and characteristics of light outputted by the flash unit 150 may be adjusted. Namely, by adjusting outputs from the plurality of light emitting devices 150a and 150b included in the flash unit 150 such that color temperatures of ambient light of a subject are matched, an image having a natural color tone may be obtained.

Figure 3:
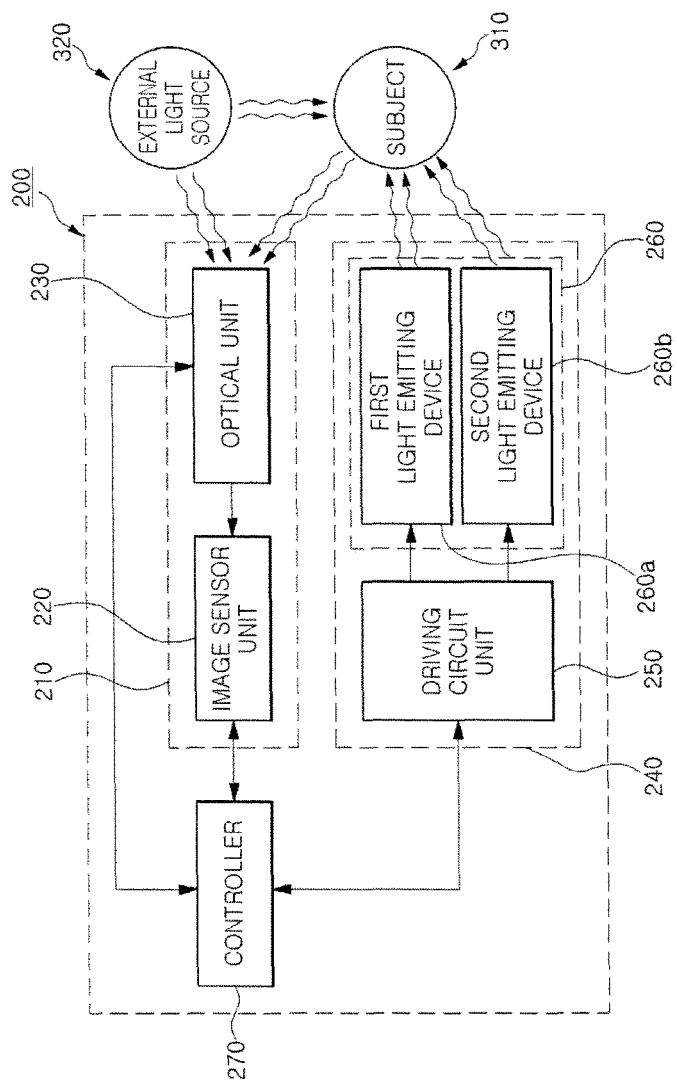
FIG. 3 is a block diagram illustrating an imaging device according to an exemplary embodiment of the present inventive concept.

FIG. 3 is a block diagram illustrating an imaging device according to an exemplary embodiment of the present inventive concept.

Referring to FIG. 3, an imaging device 200 according to an exemplary embodiment of the present inventive concept may include a camera unit 210, a flash unit 240, and a controller 270. The camera unit 210 may include an image sensor unit 220 converting light into an electrical signal and an optical unit 230 receiving light introduced from a subject 310 and an external light source 320. The flash unit 240 may include a light source unit 260 including first and second light emitting devices 260a and 260b for outputting light of different colors and a driving unit 250 for regulating operations of the first and second light emitting devices 260a and 260b based on a command from the controller 270. The driving unit 250 may be implemented as a module or a chip identical to the controller 270. Meanwhile, the imaging device 200 illustrated in FIG. 3 may be an electronic device such as a smartphone, a tablet PC, a laptop computer, or the like, as well as a digital camera.

The subject 310 may include various targets such as a person, a landscape, an object, and the like, to be imaged by the user using the imaging device 200. The external light source 320 may be artificial lighting such as natural lighting such as solar light, an incandescent lamp, a fluorescent lamp, or the like, as a light source existing outside. In case of capturing an image by activating the flash unit 240, the optical unit 230 may transmit, to the image sensor unit 220, light generated by the external light source 320 and directly transmitted to the optical unit 230. Also, the optical unit 230 may transmit, to the image sensor unit 220, light generated by the external light source 320 and the flash unit 240, and reflected by the subject 310.

Characteristics of light directly transmitted from the external light source 320 may be determined by a color temperature of the external light source 320. Characteristics of light emitted from the external light source 320 and subsequently reflected from the subject 310 so as to be transmitted may vary according to a color temperature of the external light source 320 and color characteristics, reflectivity, and the like, of the subject 310. Similarly, characteristics of light emitted from the flash unit 240 and subsequently reflected from the subject 310 so as to be transmitted may vary according to a color temperature of light emitted by the light source unit 260 of the flash unit 240 and color characteristics, reflectivity, and the like, of the subject 310.

Color characteristics of the subject 310 intended to be imaged by the imaging device 200 and a color temperature of light emitted by the external light source 320 may be unique characteristics of the subject 310 and the external light source 320, which may be determined according to imaging conditions and which may not be determined by the user. Thus, in order to express a color tone of the subject 310 actually recognized by the user's eyes, color characteristics of light emitted by the flash unit 240 may be appropriately controlled.

The first and second light emitting devices 260a and 260b may output light of different colors. For example, the first light emitting device 260a may include a light source for outputting light having a color temperature corresponding to a white color, and the second light emitting device 260b may include a light source outputting light of any one of red, yellow, and blue colors, other than white. By appropriately adjusting intensity of white light outputted by the first light emitting device 260a and intensity of colored light outputted by the second light emitting device 260b, an image may be captured such that a color tone of the subject 310 expressed in the image is identical to a color tone viewed by the user's eyes in actuality. Light sources respectively included in the first and second light emitting devices 260a and 260b may be LED devices.

In this case, intensities of light respectively outputted by the first and second light emitting devices 260a and 260b may be manually operated by a user input or may be automatically determined by the controller 270 according to a predetermined software algorithm. The software algorithm may be installed as firmware in the imaging device 200 and may be updated later. When the user manually adjusts the intensity of light, the imaging device 200 may provide a menu to the user to allow the user to directly set outputs of each of the first and second light emitting devices 260a and 260b. Even when respective colors of the first and second light emitting devices 260a and 260b are fixed to be particular colors, color characteristics of light emitted by the flash unit 240 to the subject 310 may be adjusted by changing light outputted from the respective first and second light emitting devices 260a and 260b.

The controller 270 of the imaging device 200 may automatically determine intensity of light respectively outputted by the first and second light emitting devices 260a and 260b. For example, the imaging device 200 may provide a menu for selecting color temperatures among solar light on a fine day, solar light on a cloudy day, an incandescent lamp, and a fluorescent lamp, a menu for directly inputting a color temperature by a numerical value, and the like, to the user. The controller 270 may adjust respective outputs of first and second light emitting devices 260a and 260b based on a color temperature value of the external light source 320 set by the user. In an exemplary embodiment of the present inventive concept, the controller 270 may adjust respective outputs of first and second light emitting devices 260a and 260b by regulating an amount of current applied by the driving unit 250 to the light sources included in the first and second light emitting devices 260a and 260b.

When the controller 270 automatically adjusts the intensity of light respectively outputted by the first and second light emitting devices 260a and 260b, the controller 270 may adjust outputs from the first and second light emitting devices 260a and 260b based on at least one of a color temperature of the external light source 320 and an operation mode of the camera unit 210. For example, the controller 270 may adjust outputs from the first and second light emitting devices 260a and 260b according to an operation mode, among a portrait imaging mode, a landscape imaging mode, a night view imaging mode, a close-up imaging mode, and the like, in which the camera unit 210 operates. When the camera unit 210 operates in the portrait imaging mode, the subject 310 may be determined as a person and an output from the flash unit 240 may be controlled to naturally express the subject's color tones. When the first light emitting device 260a outputs white light and the second light emitting device 260b outputs red light, an output from the second light emitting device 260b may be increased in the portrait imaging mode to express a natural skin tone, relative to a case in which only a flash of white light is used.

Also, outputs from the first light emitting device 260a and the second light emitting device 260b may be changed according to whether an operation mode of the camera unit 210 is intended to express a natural color tone or to provide a filter effect by intentionally distorting a color tone. When an operation mode of the camera unit 210 provides a filter effect based on intentional distortion of a color tone, the output from the second light emitting device 260b outputting colored light may be relatively increased to express a color tone completely different from an actual color tone of the subject 3120 in an image. Thus, unlike a general case in which the camera unit 210 and the controller 270 obtain a filter effect by applying an image processing algorithm using software, the filter effect may be obtained by adjusting an operation of the flash unit 240.

Hereinafter, various operating methods of the imaging device 200 according to exemplary embodiments of the present inventive concept will be described with reference to FIGS. 4 through 6.

Figure 4:
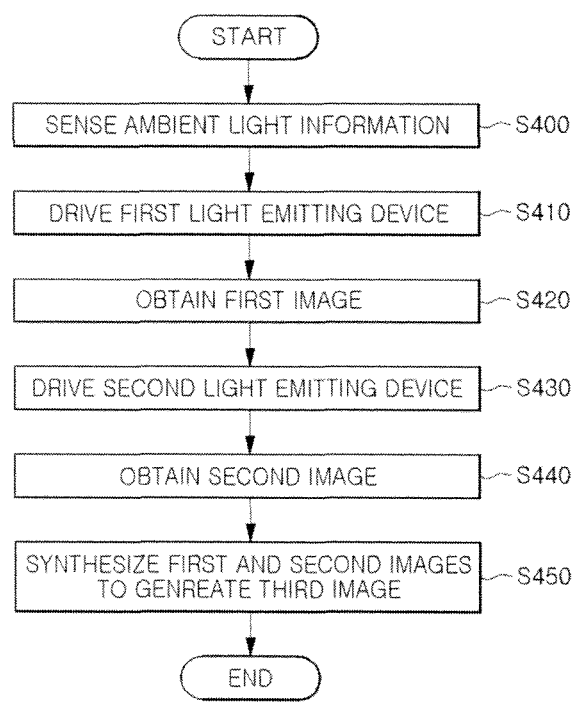
FIGS. 4 through 6 are flow charts illustrating an imaging method according to an exemplary embodiment of the present inventive concept.
Figure 5:
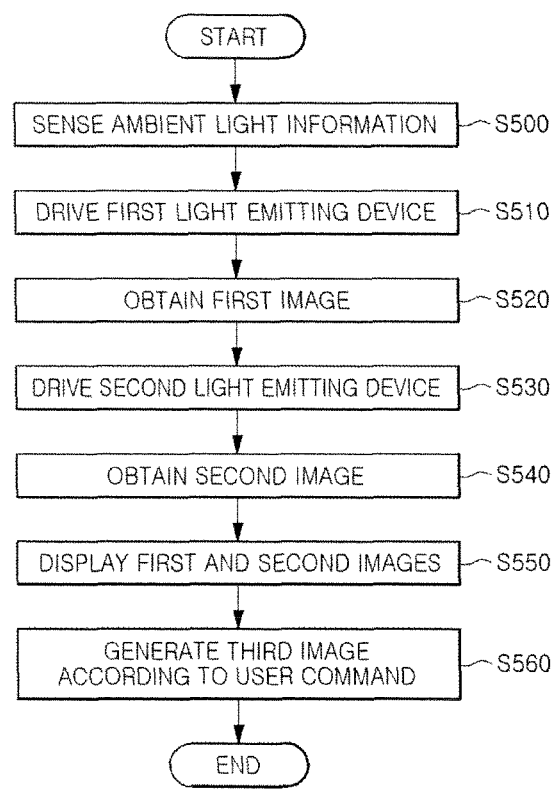
Figure 6:
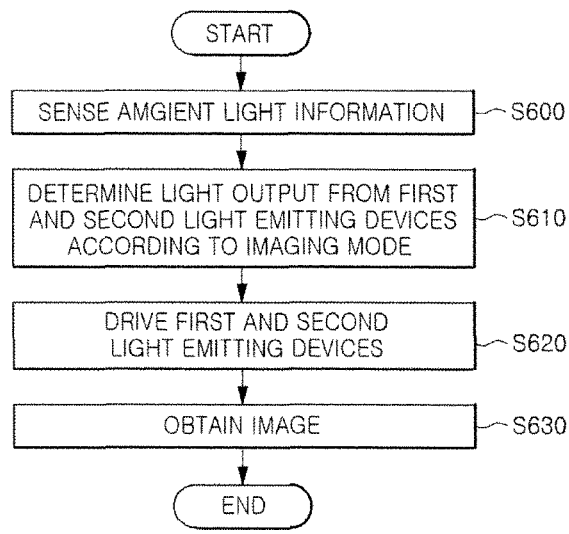

FIGS. 4 through 6 are flow charts illustrating an imaging method according to an exemplary embodiment of the present inventive concept.

Referring to FIG. 4, an imaging method according to an exemplary embodiment of the present inventive concept may start with sensing information of light introduced from the outside by the imaging device 200 (S400). In operation S400, the image sensor unit 220 may sense light transmitted from the external light source 320 into an electrical signal, and the controller 270 may sense ambient light information using the electrical signal generated by the image sensor unit 220. In operation S400, since there is no light outputted by the flash unit 240 toward the subject 310, only ambient light information by the external light source 320 may be sensed, and the ambient light information may include color temperature information of light introduced from the outside.

When the ambient light information is sensed, the controller 270 may determine an output from the first light emitting device 260a based on the sensed ambient light information and drive the first light emitting device 260a accordingly (S410). For example, the first light emitting device 260a may include a light source for outputting light having a color temperature within a predetermined range, for example, a color temperature ranging from 4,500K to 6,500K, and light outputted by the first light emitting device 260a may have a color tone such as warm white, cool white, neutral white, and the like. Output intensity of the first light emitting device 260a may be determined according to a driving current applied by the driving unit 250 to the first light emitting device 260a.

When the first light emitting device 260a is driven so the flash is triggered, the controller 270 may image the subject 310 through the camera unit 210 to obtain a first image (S420). In operation S420, light outputted from the external light source 320 and the first light emitting device 260a may be reflected from the subject 310 and subsequently transmitted to the image sensor unit 220 through the optical unit 230, and the image sensor unit 220 may convert light transmitted through the optical unit 230 into an electrical signal and generate a first image based on the converted electrical signal. The controller 270 may temporarily store the first image generated by the image sensor unit 220 and, if necessary, the controller 270 may apply a predetermined image processing algorithm to the first image.

After the first image is obtained, the controller 270 may drive the second light emitting device 260b (S430). The second light emitting device 260b may output light of a color different from a color of light outputted by the first light emitting device 260a. For example, the second light emitting device 260b may output visible light of a particular color such as red, yellow, blue, or the like. Like operation S410, in operation S430, intensity of light outputted by the second light emitting device 260b may be determined by ambient light information sensed in operation S400.

When the second light emitting device 260b operates so the flash is triggered, the controller 270 may obtain a second image through the camera unit 210 (S440). While the second light emitting device 260b operates and the flash is triggered, the image sensor unit 220 may convert light transmitted from the subject 310 through the optical unit 230 into an electrical signal and generate a second image from the converted electrical signal. The controller 270 may obtain the second image generated by the image sensor unit 220. In this case, the first image and the second image may be images obtained by imaging the same subject 310.

Since the first light emitting device 260a and the second light emitting device 260b output light of different colors, the first image and the second image may have different color tones although they are images obtained by imaging the same subject 310. When the subject 310 is a person, the first image captured using the first light emitting device 260a outputting white light as a flash may be an image in which a skin tone of the person has a strong greenish yellow color, while the second image captured using the second light emitting device 260b outputting red light as a flash may be an image in which a skin tone of the person has a red color.

The controller 270 may synthesize the first and second images to generate a third image (S450). In this case, the third image may be stored in the imaging device 200 or in a memory device provided in the mobile device 100 including the imaging device 200, and may be shown to the user as an outcome image through the display unit. A color tone of the third image may be determined by color tones of the first image and the second image. Namely, the color tone of the third image may be determined by characteristics of light outputted by the first light emitting device 260a and the second light emitting device 260b operating as flashes when the first and second images were imaged. For example, the color tone of the third image may be determined by color temperatures.

The first image and the second image may be combined based on pixels, and in this case, a predetermined weighted value may be given to each of pixel data included in the first image and pixel data included in the second image. When the weighted value given to the pixel data of the second image is greater than the weighted value given to the pixel data of the first image, the subject 310 may relatively have a red color tone, and when the weighted value given to the pixel data of the first image is greater than the weighted value given to the pixel data of the second image, the subject 310 may relatively have a blue color tone. A ratio of the weighted values given to the first image and the second image may be determined by the user or may be determined according to the ambient light information sensed in operation S400, an operation mode of the camera unit 210, and the like.

For example, when the imaging device 200 operates in an environment in which an output from the external light source 320 is very weak according to ambient light information sensed in operation S400 and an operation mode of the camera unit 210 is set to a portrait imaging mode, the controller 270 may provide a weighted value to the second image greater than a weighted value to the first image in order to naturally express a skin tone of the subject 310 as a person. In another exemplary embodiment of the present inventive concept, when the imaging device 200 is determined to operate under conditions in which an incandescent lamp is the external light source 320 according to the ambient light information sensed in operation S400, the controller 270 may provide a weighted value to the first image greater than a weighted value to the second image in order to prevent the subject 310 from being expressed in a red color tone due to the incandescent lamp.

Referring to FIG. 5, an imaging method according to an exemplary embodiment of the present inventive concept may start with sensing ambient light information by the imaging device 200 (S500). In operation S500, the imaging device 200 may sense ambient light information in the same manner as that described above in operation S400, and the ambient light information sensed in operation S500 may include light directly introduced to the imaging device 200 from the external light source 320 and color temperature information of light introduced after being reflected from the subject 310.

The controller 270 may sequentially drive the first light emitting device 260a and the second light emitting device 260b based on the ambient light information sensed in operation S500, and while the first light emitting device 260a and the second light emitting device 260b respectively operate as flashes, the camera unit 210 may image the subject 310 to obtain first and second images (S520 and S540) by driving the first and second light emitting devices, respectively (S510 and S530). Specific operation methods in operations S510 to S540 may be similar to those of operation S410 to S440.

When the first and second images are obtained by sequentially operating the first light emitting device 260a and the second light emitting device 260b to emit light as flashes, the controller 270 may display the first image and the second image on the display unit of the mobile device 100 (S550). The user may directly check the first image and the second image displayed on the display unit, and the controller 270 may generate a third image according to a command delivered from the user (S560). Hereinafter, operations S550 and S560 will be described with reference to FIGS. 7A, 7B and 8.

Figure 7A:
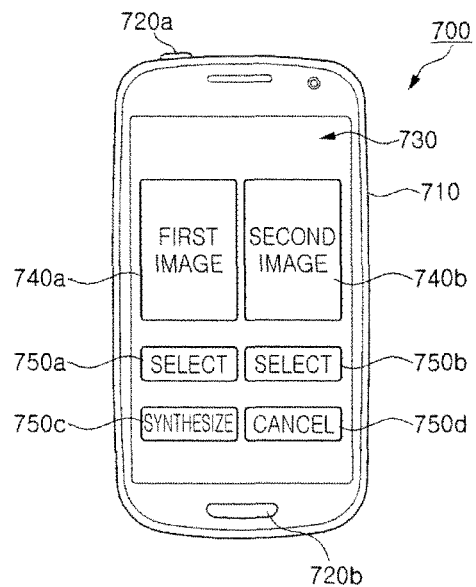
FIGS. 7A, 7B and 8 are views illustrating operations of an imaging device according to an exemplary embodiment of the present inventive concept.
Figure 7B:
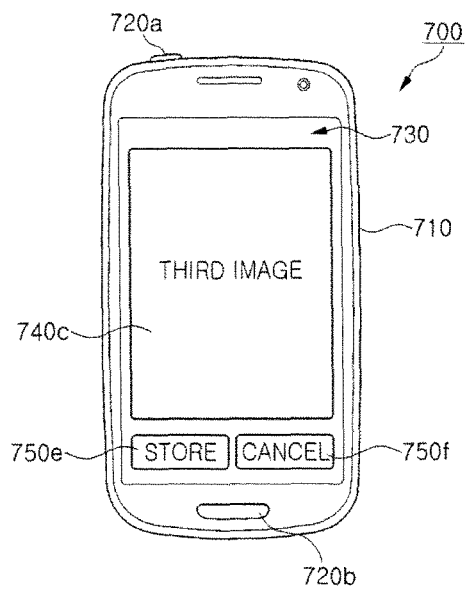
Figure 8:
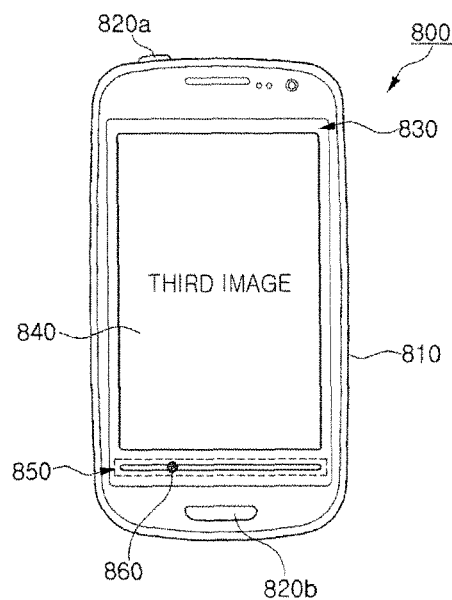

FIGS. 7A, 7B and 8 are views illustrating operations of an imaging device according to an exemplary embodiment of the present inventive concept. FIGS. 7A and 7B illustrate a mobile device 700 including the imaging device 200 according to an exemplary embodiment of the present inventive concept. The mobile device 700 may include a housing 710, input units 720a and 720b including a plurality of buttons, a display unit 730, and the like. As described above with reference to FIG. 1, the mobile device 700 may further include a memory unit storing data, a CPU performing various calculation processes, a communications module for wired/wireless communications, a touch screen unit integrally provided with the display unit 730, an audio unit for outputting a sound, a microphone for inputting a sound, and various sensors providing various functions, in addition to the elements illustrated in FIGS. 7A and 7B.

First, referring to FIG. 7A, a first image 740a and a second image 740b may be displayed on the display unit 730. The display unit 730 may further display select icons 750a and 750b for respectively selecting the first image 740a and the second image 740b, a synthesizing icon 750c for synthesizing the first image 740a and the second image 740b, a cancel icon 750d for canceling a command, and the like. The screen configuration illustrated in FIG. 7A is merely illustrative and the present disclosure is not limited thereto.

The user may touch the select icon 750a positioned below the first image 740a to select the first image 740a. When the user touches the select icon 750a positioned below the first image 740a, the first image 740a may be stored as a final outcome image in the memory unit of the mobile device 700 and displayed on the display unit 730, without performing a process of synthesizing the first image 740a and the second image 740b to generate a third image. Meanwhile, when the user selects the cancel icon 750d, the mobile device 700 may be returned to an imaging mode.

When the user touches the synthesizing icon 750c, the controller 270 may synthesize the first image 740a and the second image 740b to generate a third image 740c and display the third image 740c on the display unit 730 as illustrated in FIG. 7B. When a storage icon 750e displayed below the third image 740c is selected, the controller 270 may store the third image 740c as a final outcome image in the memory unit of the mobile device 700. Meanwhile, when a cancel icon 750f displayed below the third image 740c is selected, the controller 270 may control the display unit 730 to display the screen such as illustrated in FIG. 7A. In this case, the third image 740c may not be stored in the memory unit of the mobile device 700. Namely, the user may select any one of the first image 740a and the second image 740b as a final outcome using the user interfaces (UIs) illustrated in FIGS. 7A and 7B, or may synthesize the first image 740a and the second image 740b to generate the third image 740c. The exemplary embodiment illustrated in FIGS. 7A and 7B may be applied to operations S550 and S560 of the imaging method described above with reference to FIG. 5.

Referring to FIG. 8, a mobile device 800 may include a housing 810, input units 820a and 820b including a plurality of buttons, a display unit 830, and the like. As described above with reference to FIGS. 1 and 7, the mobile device 800 may further include a memory unit storing data, a CPU for performing calculation and command processing, a communications module for wired/wireless communications, a touch screen unit integrally provided with the display unit 730, an audio unit for outputting sound, a microphone for inputting sound, and various sensors providing various functions, in addition to the elements illustrated in FIG. 8. The exemplary embodiment of FIG. 8 may be applied to operation S450 of the imaging method described above with reference to FIG. 4, operation S560 of the imaging device described above with reference to FIG. 5, and the like.

The mobile device 800 displays a third image 840 on the display unit 830. As described above, the third image may be an image obtained by synthesizing a first image captured when the first light emitting device 260a operates as a flash and a second image captured when the second light emitting device 260b operates as a flash. Since the first light emitting device 260a and the second light emitting device 260b output lights having different wavelengths, different color characteristics such as color temperatures, and the like, the first image and the second image may express the same subject 310 with different color tones.

When the first image and the second image are synthesized, predetermined weighted values may be given to the pixel data included in the first image and the pixel data included in the second image. When the first light emitting device 260a outputs blue light having a relatively high color temperature and the second light emitting device 260b outputs red light having a relatively low color temperature, a color tone of the third image may be set to blue light by increasing the weighted value provided to the pixel data of the first image. Conversely, a color tone of the third image may be set to red light by increasing the weight value provided to the pixel data of the second image.

Referring to FIG. 8, the display unit 830 may display a scroll bar 850 operable by the user below the third image 840. Weighted values provided to the pixel data of each of the first image and the second image may be adjusted by moving an icon 860 displayed on the scroll bar 850 left and right. For example, the weighted value provided to the pixel data of the first image may be increased by moving the icon 860 to the left. The weighted value provided to the pixel data of the second image may be increased by moving the icon 860 to the right. When the first light emitting device 260a and the second light emitting device 260b output light having color characteristics complementing each other, the third image 840 having a color tone similar to a color tone of a case of using a flash outputting white light by moving the reference icon 860 may be obtained.

Hereinafter, an imaging method according to an exemplary embodiment of the present inventive concept will be described with reference to FIG. 6. In the exemplary embodiment illustrated in FIG. 6, the imaging method may start with sensing ambient light information by the imaging device 200 (S600). In operation S600, the imaging device 200 may sense ambient light information in the same manner as that described above in operation S400. The ambient light information sensed in operation S600 may include light directly introduced to the imaging device 200 from the external light source 320 and color temperature information of light introduced upon being reflected from the subject 310.

When the ambient light information is sensed, the controller 270 may determine light outputted from the first light emitting device 260a and the second light emitting device 260b based on the imaging mode of the camera unit 210 and the ambient light information sensed in operation S600 (S610). The first light emitting device 260a and the second light emitting device 260b may output light of different colors, and in this case, the first light emitting device 260a may output white light, while the second light emitting device 260b may output colored light. In another exemplary embodiment of the present inventive concept, the first light emitting device 260a and the second light emitting device 260b may output colored light having color characteristics complementing each other.

Color characteristics of light outputted respectively by the first light emitting device 260a and the second light emitting device 260b may not be substantially changed. However, by adjusting outputs respectively from the first light emitting device 260a and the second light emitting device 260b, color characteristics, for example, color temperatures, or the like, by light outputted by the light source unit 260 may be adjusted. In an exemplary embodiment of the present inventive concept, the controller 270 may adjust outputs from the first light emitting device 260a and the second light emitting device 260b such that light identical to ambient light information sensed in operation S600 may be outputted from the flash unit 240. Alternatively, outputs respectively from the first light emitting device 260a and the second light emitting device 260b may be adjusted according to an imaging mode of the camera unit 210 set by the user.

When outputs respectively from the first light emitting device 260a and the second light emitting device 260b are determined, the first and second light emitting devices 260a and 260b may be simultaneously driven so as to be triggered as flashes, and the subject 310 may be imaged to obtain an image (S620 and S630). By determining color characteristics of light outputted by the flash unit 240 according to color temperature information of ambient light varied according to the external light source 320 and the subject 310 and an operation mode, for example, a portrait imaging mode, a night view imaging mode, a landscape imaging mode, a close-up mode, and the like, of the camera unit 210 set by the user, an image having a color tone most similar to a color tone of the subject 310 seen by the eyes in actuality may be obtained. Alternatively, an image reflecting a filter effect may also be obtained by intentionally distorting a color tone of the subject 310 expressed in an image by adjusting outputs from the first and second light emitting devices 260a and 260b.

As set forth above, according to exemplary embodiments of the present inventive concept, a plurality of images may be captured by operating a plurality of light emitting devices for outputting light of different colors as flashes, respectively, and combined to provide an image having a color tone desired by a user. Thus, a camera flash device, an imaging device, and an imaging method capable of capturing images providing various filter effects according to a user selection, as well as providing an image having a natural color tone, may be provided.

While exemplary embodiments have been shown and described above, it will be apparent to those skilled in the art that modifications and variations could be made without departing from the spirit and scope of the present disclosure as defined by the appended claims.

What is claimed is:

1. A flash device for a camera, the flash device comprising:
   a light source including a plurality of light emitting devices, each to output light of a different color; and
   a controller to drive a first light emitting device among the plurality of light emitting devices when the camera images a subject to obtain a first image, and drive a second light emitting device different from the first light emitting device among the plurality of light emitting devices when the camera images the subject to obtain a second image,
   wherein the controller adjusts intensity of light output by the light source when obtaining the first image and when obtaining the second image based on a color temperature of ambient light sensed by the camera that images the subject, wherein
   the controller generates a third image based on weighted pixel data of the first image and weighted pixel data of the second image, the weighted pixel data of the first image and the weighted pixel data of the second image being calculated by applying predetermined weighted values to pixel data of the first image and pixel data of the second image, respectively, and wherein
   the predetermined weight values given to the pixel data of the first image and the pixel data of the second image are determined based on the color temperature of the ambient light sensed by the camera that images the subject.

2. The flash device of claim 1, wherein the light source comprises one or more light emitting devices to output white light.

3. The flash device of claim 2, wherein one of the first light emitting device and the second light emitting device outputs white light, and the other of the first light emitting device and the second light emitting device outputs colored light.

4. The flash device of claim 1, wherein light outputted by the first light emitting device and light outputted by the second light emitting device have color characteristics complementing each other.

5. The flash device of claim 1, wherein the controller determines outputs from the first light emitting device and the second light emitting device based on at least one of a color temperature of ambient light sensed by the camera and an operation mode of the camera.

6. The flash device of claim 1, wherein the controller selects the first light emitting device and the second light emitting device among the plurality of light emitting devices based on at least one of a color temperature of ambient light sensed by the camera and an operation mode of the camera.

7. An imaging device, comprising:
a flash including a plurality of light emitting devices respectively outputting light of different colors;
a camera to image a subject to sequentially obtain a first image and a second image; and
a controller to sequentially drive a first light emitting device among the plurality of light emitting devices when the camera images the subject to obtain the first image and drive a second light emitting device different from the first light emitting device when the camera images the subject to obtain the second image,
wherein the controller generates a third image based on weighted pixel data of the first image and weighted pixel data of the second image, the weighted pixel data of the first image and the weighted pixel data of the second image being calculated by applying predetermined weighted values to pixel data of the first image and pixel data of the second image, respectively, and wherein
the predetermined weight values given to the pixel data of the first image and the pixel data of the second image are determined based on a color temperature of ambient light sensed by the camera that images the subject.

8. The imaging device of claim 7, wherein the camera comprises:
an optic including one or more lenses; and
an image sensor to convert light introduced through the optic into an electrical signal.

9. The imaging device of claim 8, wherein the controller senses a color temperature of light introduced through the optic based on the electrical signal.

10. The imaging device of claim 9, wherein the controller selects the first light emitting device and the second light emitting device from among the plurality of light emitting devices based on at least one of a color temperature of light introduced through the optic and an operation mode of the camera.

11. The imaging device of claim 9, wherein the controller determines outputs from the first light emitting device and the second light emitting device based on at least one of a color temperature of light introduced through the optic and an operation mode of the camera.

12. The imaging device of claim 7, wherein the controller determines the weighted values applied to the pixel data of the first image and the pixel data of the second image based on ambient light information.

13. The imaging device of claim 7, wherein the controller determines the weighted values applied to the pixel data of the first image and the pixel data of the second image based on respective outputs from the first light emitting device and the second light emitting device.

14. The imaging device of claim 7, wherein the controller determines the weighted values applied to the pixel data of the first image and the pixel data of the second image based on respective colors of the first light emitting device and the second light emitting device.

15. The imaging device of claim 7, wherein at least one of the first light emitting device and the second light emitting device outputs white light.

16. The imaging device of claim 7, wherein light outputted by the first light emitting device and light output by the second light emitting device have color characteristics complementing each other.

* * * * *